Sept. 29, 1953     R. EICHENBERG     2,653,789
VALVE

Filed Jan. 5, 1950     3 Sheets-Sheet 1

Robert Eichenberg
INVENTOR.

BY Murray Robinson

ATTORNEY

Sept. 29, 1953 R. EICHENBERG 2,653,789
VALVE

Filed Jan. 5, 1950 3 Sheets-Sheet 2

*Robert Eichenberg*
INVENTOR.

BY *Murray Robinson*

ATTORNEY

Robert Eichenberg
INVENTOR.

BY Murray Robinson

ATTORNEY

Patented Sept. 29, 1953

2,653,789

UNITED STATES PATENT OFFICE 2,653,789

VALVE

Robert Eichenberg, Houston, Tex., assignor to McEvoy Company, Houston, Tex., a corporation of Texas Application January 5, 1950, Serial No. 136,985

2 Claims. (Cl. 251—63.5)

This invention pertains to valves and more particularly to valves of the sliding type in which a valve member rests on the valve seat in both open and closed positions, being movable across the valve seat from a position in which it blocks passage through the opening in the seat to a position in which an opening in the member is aligned with that in the seat to permit flow through the valve. The invention is especially suitable for use in connection with gate valves in which the motion of the valve member relative to the seat is one of translation in the plane of the gate as distinguished from a plug valve in which the motion is one of rotation about the axis of the valve member, but by suitable modification the invention can be applied to plug valves as well as gate valves.

Valves of the sliding type described above may be difficult to open due to the friction between the seat and valve member. Until the valve is partially opened the full pressure of the line acts on the upstream side of the valve while the downstream side will be at atmospheric pressure. The net force on the valve will be equal to the difference between these pressures multiplied by the area of the opening in the seat. This force multiplied by the coefficient of friction between valve member and seat is the force to be overcome in opening the valve. If the line pressure is high the force may be so great that it will be extremely difficult to open the valve. This force must be exerted over a length of travel of the valve equal to the distance from the inner edge of the seat to the nearest edge of the port in the valve member.

In another type of valve the valve member is not maintained against the seat in all positions. Instead the valve member is lifted directly away from its seat when the valve is opened, line fluid passing around the valve member into the opening in the seat. With such valves the force to be overcome in opening the valve is not merely a fraction of the force between the valve and seat equal to the coefficient of friction but is the full force due to the difference in pressures on opposite sides of the valve. However once the force has been overcome and the valve moved the slightest amount, the slight opening will equalize the pressures and the valve can be opened fully without much difficulty. The requisite force for initially cracking open the valve can be obtained by a suitable lever, screw or cam.

Despite certain advantages of the lift valve as to ease of opening, this type of valve is not suited for use where due to high line pressures a fluid packing must be used between valve and seat for with such lubricated valves the valve and seat cannot be left separated without loss of packing fluid.

It is an object of the invention to provide a valve which can be easily opened.

It is a further object of the invention to provide a lubricated valve which can be easily opened without loss of sealing fluid.

It is a further object of the invention to provide an improved gate valve which will seal against high pressures, can be easily opened, and which may be opened and closed many times without loss of function.

Other objects and advantages of the invention will appear from the following description of a preferred embodiment thereof in which.

Figure 1:
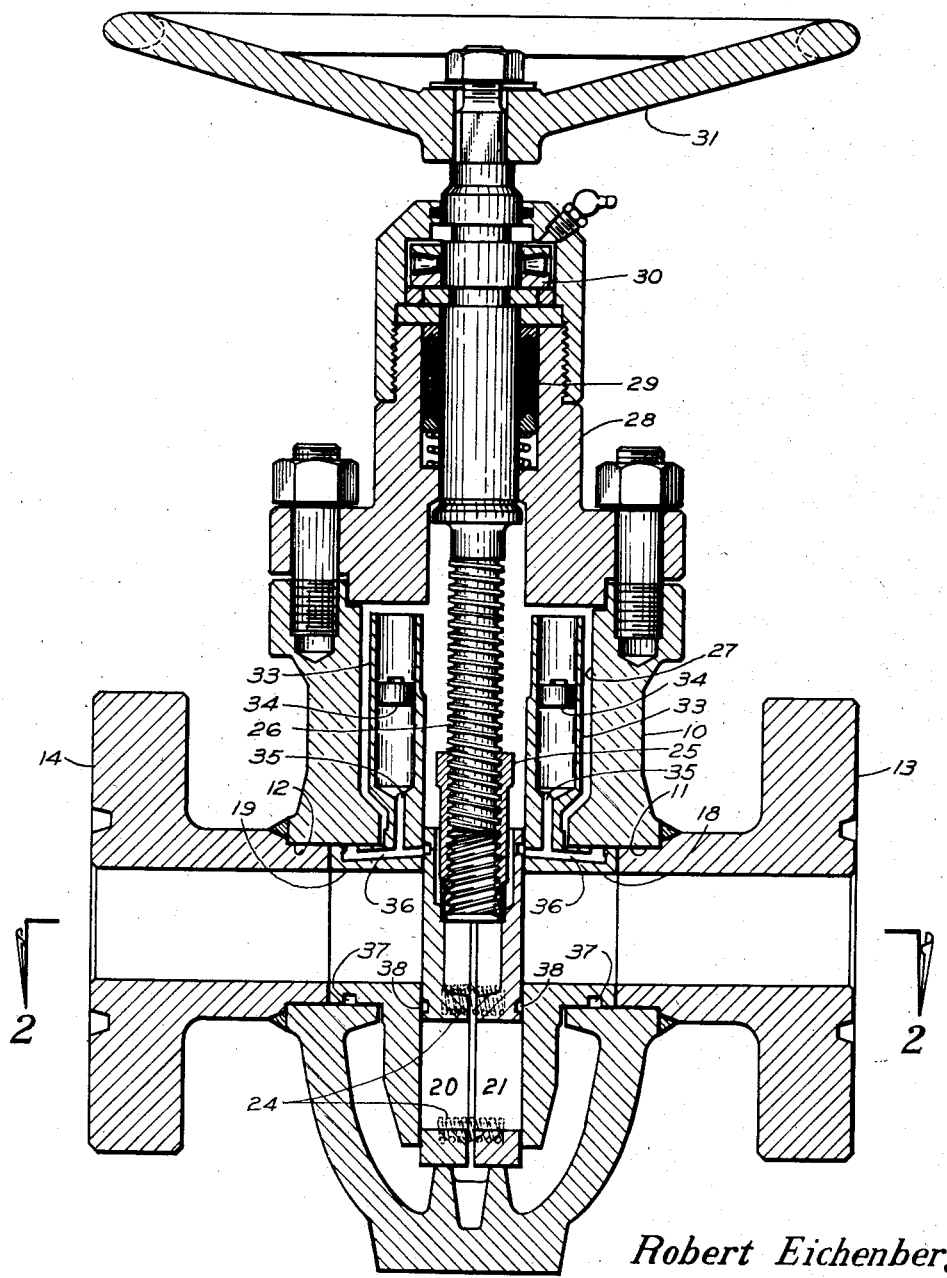
Figure 1 is a section through a valve according to the invention taken in the plane of the stem and flow passage axes.

Referring to Figure 1 there is shown a valve body 10 having inlet and outlet ports 11 and 12 therein to which are welded flanged couplings 13 and 14. Inside the valve body are removably disposed valve seats 18 and 19.

Figure 2:
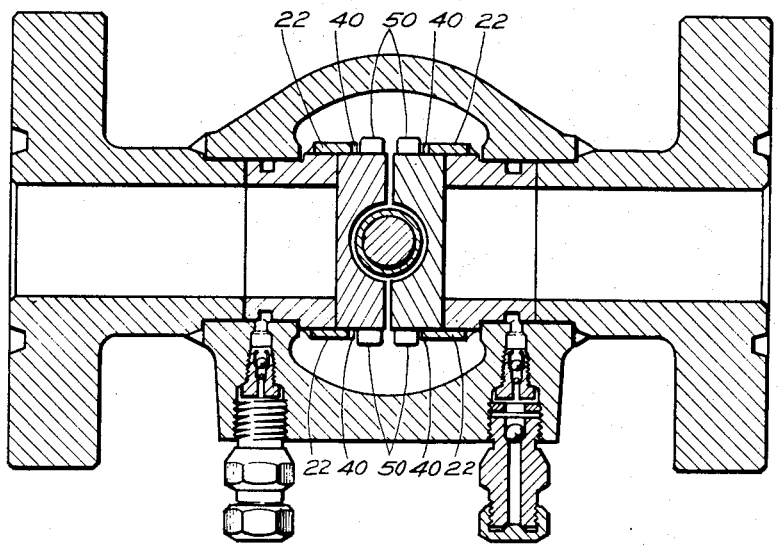
Figure 2 is a section through the valve taken on planes perpendicular to the valve stem and for the most part along the flow axis of the valve.
Figure 3:
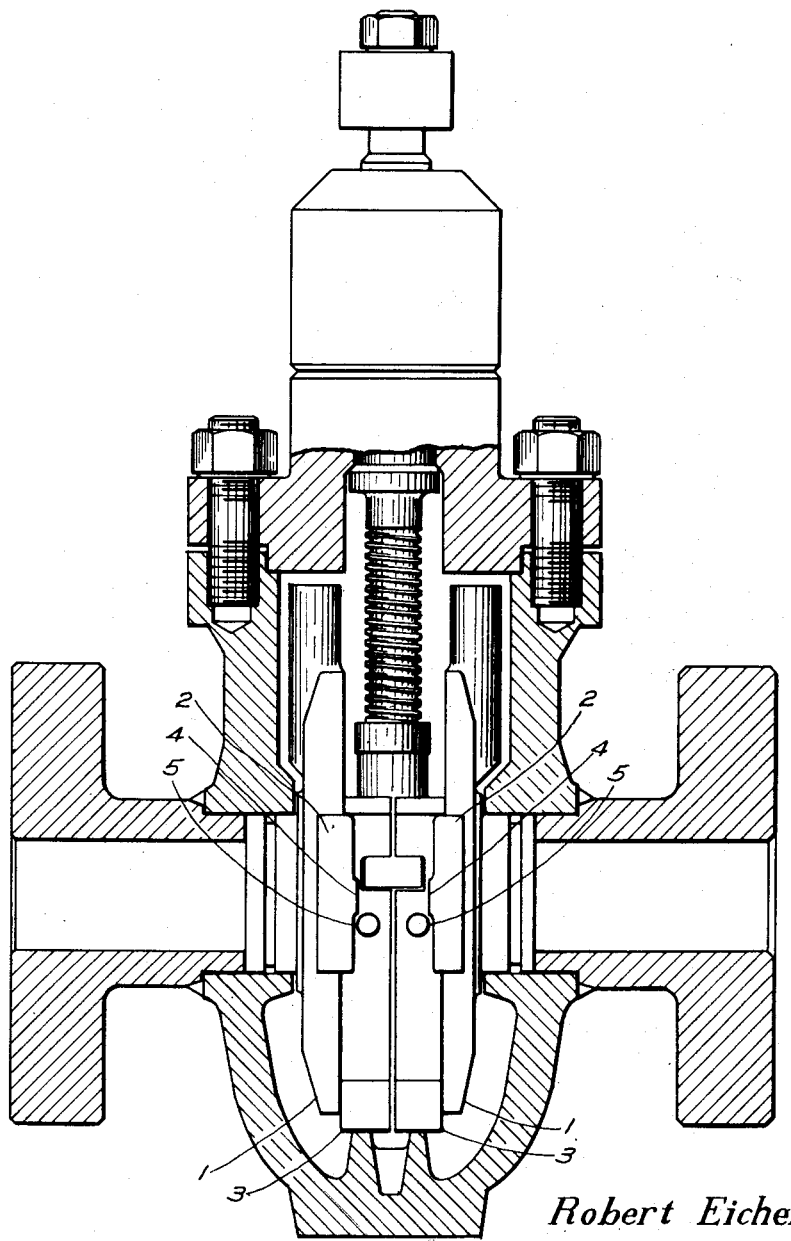
Figure 3 is a section similar to Figure 1 with certain of the parts shown in elevation.

As shown in Figures 2 and 3, the seats have guide strips 22 welded to their sides to guide the gates 23 slidably disposed therebetween.

Referring again to Figure 1, each of the gates has a flow passage therethrough provided by the openings 20 and 21. The gates are urged apart by springs 24. A nut 25 is connected at its lower end to the gates and the stem 26 is threaded therein. The top of the stem passes out through opening 27 in the top of the valve body. A bonnet 28 containing packing 29 seals between the stem and body and carries a bearing 30 to take the thrust of the valve stem when it is turned by hand wheel 31 to raise and lower the gates thereby opening and closing the valve.

At the top of the seats are carried cylinders 33 containing grease or other sealing and lubricating fluid. The ends of these cylinders are open so as to expose pistons 34 slidably disposed in the cylinders to the pressure inside the valve body. The lower ends of the cylinders are connected by ports 35, 36 to annular grooves 37 in the valve seat necks and annular grooves 38 in the faces of the gates when the latter are in closed position. The grease provides a seal between the seats and body and between the gates and seats. Line fluid will usually leak pass the upstream gate into the valve body which will then be at line pressure. This pressure exerted on the pistons 34 will produce enough pressure on the grease to seal the downstream gate.

Referring again to Figures 2 and 3, each of the guide strips 22 is provided with cam surfaces 40 on which ride pins 50 which are secured to the gates by press fitting. In the closed position as shown the pins have a small amount of clearance from the guide strip to permit seating of the gates. When the gate is pulled upward by the stem thread, the pins ride on the cam surfaces and thereby lift the gates off the seat surfaces, breaking the seal and releasing the pressure and friction. The gates can then be easily moved upwardly to full open position and as they do so the pins pass the cam surfaces allowing the gates once again to rest on the seats. The length of the cam surface is just enough to keep the gates off the seats until the lateral motion of the gates parallel to the seat faces brings part of the gate openings into coincidence with the seat openings, and the gates are moved back into contact with their seats and remain in contact therewith during the remainder of their travel to full open position. This prevents grease in the gates from being washed out by line fluid and also preventing damage to the seat and gate sealing surfaces due to erosion by the line fluid. This is particularly important in an oil pipe line valve since the oil usually contains sand and other abrasive materials.

It will be apparent that the cam surfaces and the pins or cam followers serve to move the gates normally off of the seat surfaces, that is in a direction having a normal component relative to the seat surfaces, as distinguished from sliding over the seat surfaces.

While a preferred embodiment of the invention has been illustrated and described, it is obvious that many modifications thereof can be made by one skilled in the art without departing from the spirit of the invention. It is intended to protect by Letters Patent all forms of the invention falling within the scope of the appended claims.

I claim:

1. A gate valve including a valve body having an inlet and an outlet, plane surfaced seats in said inlet and outlet each having an opening therethrough, a pair of plane surfaced gates each having an opening therethrough, springs between said gates urging said gates against said seats, means to reciprocate said gates between a closed position in which the gates block passage through the inlet and outlet and an open position in which the gate openings are aligned with the inlet and outlet, strips on the sides of the seats to guide the gates in their reciprocation, pins on the sides of the gates, cams on the edges of the strips adapted to engage said pins and cause the gates to move toward each other against the action of said springs and away from their seats as the pins pass over the cams in their motion from closed to open position, said cams being positioned to engage said pins at the start of opening movement of said gates, the active length of said cams being equal to the distance the gates must move from closed position to cause the openings therethrough to just overlap the seat openings, said resilient means causing engagement of said plane surfaces when said pins are out of engagement with the active surfaces of said cams, whereby said plane surfaces are in contact at all times except during the initial opening movement of said valve.

2. A valve including a body having an inlet opening and an outlet opening, a seat member disposed around at least one of said openings, a gate member having a passage therethrough, a channel around said one opening in between said gate and seat members, means to supply fluid material to said channel, means to reciprocate the gate across the seat between a closed position in which the gate blocks passage through said one opening and an open position in which said passage through the gate is aligned with said one opening, means urging said gate toward said seat and into contact therewith, a cam and a cam follower disposed one on one of said gate and seat members and the other fixed relative to the other of said gate and seat members, said cam and follower being adapted for engagement to cause said members to separate in a direction having a component normal to their contacting surfaces as the gate is moved from closed to open position, the active length of said cam in which it maintains the gate separated from the seat being less than the full travel of the gate to open position to permit the gate to return to contact with the seat after the valve has partially opened to close said channel therebetween.

ROBERT EICHENBERG.

References Cited in the file of this patent

UNITED STATES PATENTS

| Number | Name | Date |
|---|---|---|
| 1,647,734 | Kelly | Nov. 1, 1927 |
| 1,836,374 | Kelly | Dec. 15, 1931 |
| 2,433,638 | Volpin | Dec. 30, 1947 |
| 2,443,929 | Patterson | June 22, 1948 |

FOREIGN PATENTS

| Number | Country | Date |
|---|---|---|
| 503,772 | Germany | of 1930 |